US007416513B2

United States Patent
Amann et al.

(10) Patent No.: US 7,416,513 B2
(45) Date of Patent: Aug. 26, 2008

(54) VARIABLE RESOLUTION SINGLE LEVER SPEED CONTROL FOR A HYDROSTATIC TRANSMISSION

(75) Inventors: Craig Amann, Cedar Falls, IA (US); Daniel Marc Heim, Port Byron, IL (US)

(73) Assignee: Deere & Company, Moline, IL (US)

( * ) Notice: Subject to any disclaimer, the term of this patent is extended or adjusted under 35 U.S.C. 154(b) by 267 days.

(21) Appl. No.: 11/327,102

(22) Filed: Jan. 6, 2006

(65) Prior Publication Data
US 2006/0152183 A1    Jul. 13, 2006

(30) Foreign Application Priority Data
Jan. 12, 2005   (EP)   ................... 05100148

(51) Int. Cl.
*F16H 47/00*   (2006.01)
(52) U.S. Cl. .......................................... 477/52; 477/68

(58) Field of Classification Search ................ 477/52, 477/68
See application file for complete search history.

(56) References Cited

U.S. PATENT DOCUMENTS

| 6,223,111 | B1 * | 4/2001 | Cronin et al. ............... 701/51 |
| 6,359,403 | B1 | 3/2002 | Pollklas et al. ............. 318/432 |
| 6,402,660 | B1 * | 6/2002 | Cronin et al. ............... 477/68 |
| 6,852,064 | B2 * | 2/2005 | Carlson et al. .............. 477/52 |
| 7,059,999 | B2 * | 6/2006 | Glora et al. ................ 477/110 |
| 2004/0023756 | A1 | 2/2004 | Ingo et al. ................. 477/107 |

FOREIGN PATENT DOCUMENTS

EP    1 431 619    6/2004

OTHER PUBLICATIONS

European Search Report for 05100148.5.

* cited by examiner

*Primary Examiner*—Sherry Estremsky

(57) ABSTRACT

The invention refers to a self-propelled working machine comprising ground engaging means that are in drive connection with an engine for propelling the working machine, a desired speed input means having a range of movement for inputting a desired speed, a control unit receiving a desired speed signal from the desired speed input means and controlling an actuator that is influencing the speed of the ground engaging means based upon the desired speed signal.

16 Claims, 3 Drawing Sheets

VARIABLE RESOLUTION SINGLE LEVER SPEED CONTROL FOR A HYDROSTATIC TRANSMISSION

FIELD OF THE INVENTION

The invention relates to self-propelled working machines comprising ground engaging means that are in drive connection with an engine for propelling the working machine, a desired speed input means having a range of movement for inputting a desired speed, a control unit operable to receive a desired speed signal from the desired speed input means and operable to control an actuator that is influencing the speed of the ground engaging means based upon the desired speed signal.

BACKGROUND OF THE INVENTION

Self-propelled harvesting machines, as combines, forage harvesters or cotton pickers, are usually propelled by a hydrostatic motor which is in hydraulic connection with a pump driven by a combustion engine. Such a harvesting machine is described in EP 0 819 562 A. There, the output speed of the hydrostatic motor is determined by a operator by means of an operating lever or drive lever mechanically controlling the position of a swash plate of the pump. The hydrostatic motor is driving the wheels of the harvesting machine via a gearbox with a transmission ratio selected by the operator. The speed range of the harvesting machine that can be obtained by moving the operating lever along its available path depends on the selected transmission ratio. Hence, in the first transmission ratio, a smaller speed range is achieved as in the third transmission ratio. Thus, independent of the selected transmission ratio, at least almost the full moving range of the operating lever is available for changing the propelling speed. A disadvantage however is that the operator has to perform the transmission ratio selection manually and that the machine has to stop before another transmission ratio can be selected.

Another drive system for a self-propelled harvesting machine is described in EP 1 431 619 A. There, the hydrostatic motor drives the wheels via a gearbox enabling a transmission ratio change even while the machine is driving. The position of the swash plate of the pump and of a swash plate of the hydrostatic motor are determined by an electronic control unit receiving a desired speed input signal from a potentiometer connected to the operating lever. In a work mode, only the first transmission ratio is selected and the moving range of the operating lever corresponds to the entire speed range for the work mode. In a transport mode, a first and a second transmission ratio are automatically selected and the moving range of the operating lever corresponds to the entire speed range for the transport mode. The control unit obtains input regarding the operating mode from an operator or derives the operating mode from the state of work elements of the machine. Here, only two speed ranges of the operating lever are available, such that the propelling speed of the machine cannot always be controlled as sensitively as desired, for example when the machine is in the transport mode, but driving slowly downhill or uphill or on narrow lanes.

SUMMARY OF THE INVENTION

The problem underlying the invention is to provide a work machine with an input means for inputting a desired speed having a range of movement that conforms to the actual drive situation.

The working machine comprises a control unit receiving a desired speed signal from the desired speed input means, generally an operating lever or drive lever, and submitting control signals based upon the desired speed signal to an actuator which determines the propelling speed. The desired speed input means is operated by an operator who can move it over a certain movement range. It is proposed that the relation between the position of the desired speed input means and the propelling speed is automatically determined by the control unit. The control unit thus recognizes the speed range in which the operator wants to drive from the desired speed signal and adjusts the relation between the desired speed signal and the propelling speed in a manner such the range of movement of the desired speed input means corresponds to said speed range.

It is an advantage of the invention that the range of movement or stroke of the desired speed input means is always adjusted to the actual drive situation. Thus, a sufficiently sensitive speed input means having an optimal resolution is provided. The operator does not need to operate any switches to determine or adjust the relation between the desired speed and the propelling speed to the actual operation situation.

The propelling speed during operation is based upon the established relation between the desired speed input signal and the propelling speed. The operator can thus define a propelling speed between zero and a maximal speed assigned to this relation. If he wants to accelerate the working machine beyond the maximal speed of the established relation, the control unit is preferably operable in a manner allowing the operator to move the desired speed input means into a so-called acceleration zone defined in the vicinity of the maximal speed position of the desired speed input means. The control unit is then operable to instruct the actuators to accelerate the working machine beyond the maximal speed of the established relation. In this aspect of the invention, there is thus an acceleration zone at the end of the stroke of the desired speed input means.

If the desired speed input means is moved into said acceleration zone, the work vehicle accelerates until a speed desired by the operator is reached and then the operator is assumed to retract or pull back the desired speed input means. The relation between the desired speed signal and the propelling speed is established when the desired speed input signal is reduced for a predetermined time period after an acceleration. This relation is preferably determined by the control unit in a manner such that the speed of the working machine keeps constant until the position of the desired speed input means is in its final retracted position. Thus, an unwanted acceleration or deceleration is avoided. The final retracted position of the desired speed input means and the propelling speed of the working machine then achieved determine the new relation between the desired speed signal and the propelling speed established by the control unit. By appropriate selection of the final retracted position, the user can obtain the best relation. If he wants to drive with the achieved speed or slower, he positions the desired speed input means at the upper end of its range, while he can locate it in a lower portion of the range if a later acceleration is still desired.

When the working machine is starting from a zero speed, it is useful to use a first relation between the desired speed signal and the propelling speed with a relatively small slope. The operator can thus accelerate the machine smoothly. If he wants to achieve a higher speed than can be achieved with the first relation, he is able to move the desired speed input means into the maximal speed position, such that acceleration takes place.

When the working machine has been driving with an established relation between the desired speed input signal and the propelling speed for a predetermined time period, the operator may want to accelerate the machine again. Since it can be assumed that after this time period has passed, no large acceleration is required, at least when the position of the desired speed input means is below a certain threshold, the control unit is preferably operable to change then the relation between the desired speed signal and the propelling speed to another relation with a smaller slope. The working machine is thus accelerated more smoothly than with the old relation between the desired speed signal and the propelling speed. If the operator wants to accelerate faster, he can nevertheless move the desired speed input means into the acceleration zone. On the other hand, if the operator moves the desired speed input means into a lower speed position after driving for a predetermined time period with a constant speed, the established relation between the desired speed signal and the propelling speed is maintained. The machine can thus be decelerated in a short time.

The relation between the desired speed signal and the propelling speed is preferably linear, although non-linear relations, as cubic, exponential, logarithmic or any other suitable algebraic relations could be used. In a relatively simple embodiment, only a predetermined number of relations are available. On the other hand, it would be possible to provide an infinite number of relations between the desired speed signal and the propelling speed.

BRIEF DESCRIPTION OF THE DRAWINGS

The Figures show one embodiment of the invention, which is described in greater detail below.

DESCRIPTION OF THE PREFERRED EMBODIMENT

Figure 1:
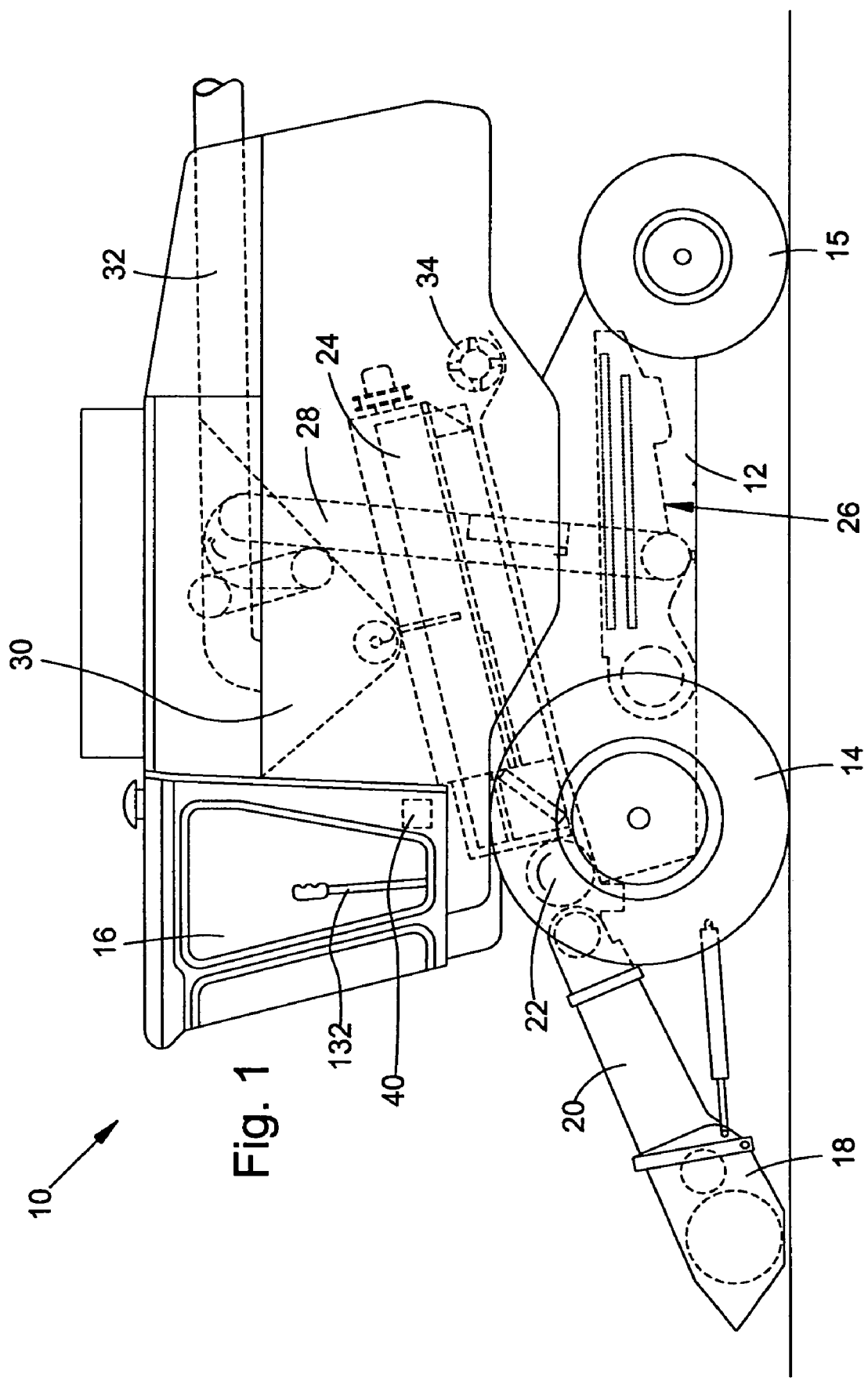
FIG. 1 is a schematic, left side elevational view of a working machine with which the present invention is particularly adapted for use.

FIG. 1 shows a self-propelled agricultural working machine 10 in the form of a combine comprising a supporting structure 12 having ground engaging means 14, 15 in the form of wheels extending from the supporting structure. Instead of wheels, tracks could be used. The operation of the working machine 10 is controlled from operator's cab 16. A harvesting platform 18 is used for harvesting a crop and directing it to a feederhouse 20. The harvested crop is directed by the feederhouse 20 to a beater 22. The beater 22 directs the crop upwardly through an inlet transition section to an axial crop processing unit 24. The crop processing unit 24 threshes and separates the harvested crop material. Grain and chaff fall through grates on the bottom of the unit 24 to a cleaning system 26. The cleaning system 26 removes the chaff and directs the clean grain to a clean grain elevator 28. The clean grain elevator 28 deposits the clean grain in a grain tank 30. The clean grain in the tank 30 can be unloaded into a grain cart or truck by an unloading auger 32. Threshed and separated straw is discharged from the axial crop processing unit 24 through an outlet to a discharge beater 34. The discharge beater 34 in turn propels the straw out the rear of the working machine 10.

It should be mentioned that the present invention could be used on any other self-propelled working machine, for example self-propelled harvesting machines like cotton or forage harvesters, on tractors, wheeled loaders or construction equipment.

Figure 2:
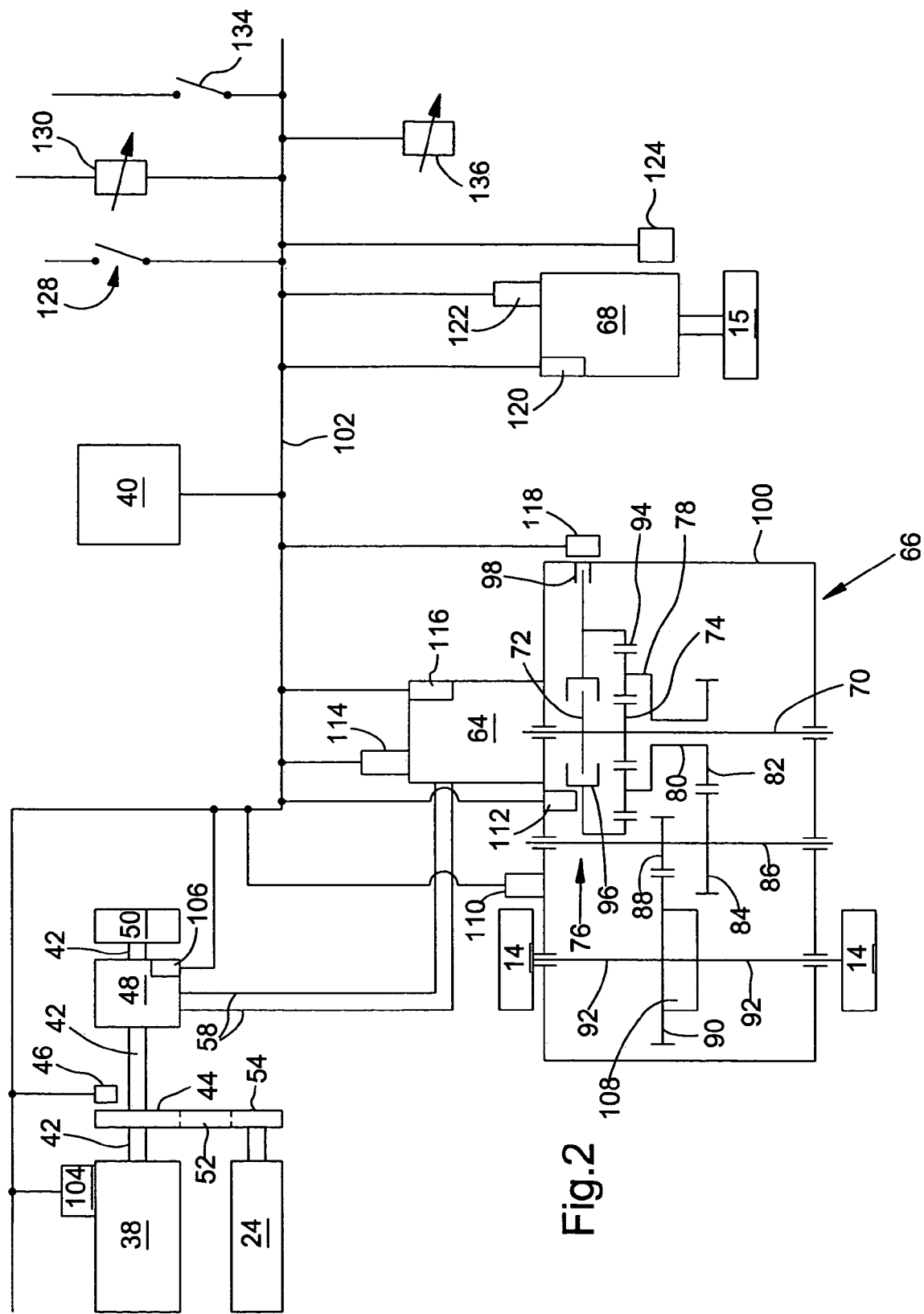
FIG. 2 is a schematic representation of the drive system for the working machine of FIG. 1.

The drive power required for the forward propulsion and for the operation of the working machine 10 is provided by an internal combustion engine 38 (FIG. 2), which is usually a Diesel engine. An electronic control unit 40 is arranged in the operator's cab 16. FIG. 2 shows a schematic representation of the drive and propelling system of the working machine 10. The internal combustion engine 38 drives a shaft 42, on which a clutch 44 is arranged, that can be engaged and disengaged by an electromagnet 46. Furthermore, the shaft 42 drives a hydraulic pump 48 and a supply pump 50 that is used to supply the hydraulic systems of the working machine 10 except for the hydraulic motors used for the forward propulsion drive. The clutch 44 is arranged within a first belt pulley about which a drive belt 52 circulates that also circulates about a second belt pulley 54. The second belt pulley 54 is connected to drive the crop processing unit 24. The power to drive the harvesting platform 18, the feederhouse 20, the beater 22, the discharge beater 34 and the remaining driven elements of the working machine 10 is transmitted from the shaft 42 or the second belt pulley 54 via additional belts and/or shafts (not shown).

The hydraulic pump 48 is connected by hydraulic lines 58 with a hydraulic motor 64. The hydraulic motor 64 is connected over a transmission 66 so as to drive the front wheels 14. Between the transmission 66 and the front ground engaging means 14, a differential gearbox 108, and in each case, a drive shaft 92 are arranged which drive the ground engaging means 14 over axle end drives (not shown).

A second hydraulic motor 68 is also connected with the hydraulic pump 48 over lines carrying hydraulic fluid (not shown for the sake of clarity). The second hydraulic motor 68 is connected so as to drive the rear ground engaging means 15, where a differential gearbox may also be provided or a hydraulic motor 68 is associated with each rear wheel 15.

The transmission 66 includes an input shaft 70 that is driven directly by the hydraulic motor 64 and that carries a cylindrical clutch disk 72. Furthermore, a sun gear 74 of a planetary transmission 76 is fastened to the input shaft 70. A planet carrier 78 of the planetary transmission 76 is connected to a gear 82 over a hollow shaft 80, that is arranged coaxially to the input shaft 70 and is supported in bearings on it, free to rotate, and the planet carrier 78 is coupled over a further gear 84 to an intermediate shaft 86, so as to carry or transfer torque. The intermediate shaft 86 drives a gear 88 that meshes with a gear 90, which drives a differential gearbox 108, which drives two output shafts 92. Each of the output shafts 92 is connected so as to drive one of the front ground engaging means 14.

The ring gear 94 of the planetary transmission 76 can be brought into engagement and out of engagement with the clutch disk 72 by a clutch 96 that can be actuated. Furthermore, a brake arrangement 98 is arranged between the housing 100 of the transmission 66 and the ring gear 94, with which the ring gear 94 can be held in a stationary position.

If the brake 98 is applied and clutch 96 is disengaged, the ring gear 94 is stopped. Then the hydraulic motor 64 drives the sun gear 74 over the input shaft 70, whereby the planetary transmission 76 produces a gear reduction ratio. The output drive is performed over the planet carrier 78, the hollow shaft 80, the gear pair 82, 84, the intermediate shaft 86, the gear pair 88, 90, and the output shaft 92, and the axle end drive to the front wheel 14.

If the brake 98 is released and the clutch 96 is engaged, the ring gear 94 is driven over the input shaft 70 by the hydraulic motor 64 at the same rotational speed with which the sun gear 74 is also driven. Therefore, the speed difference between the ring gear 94 and the sun gear 74 is less than in the operating mode described above, in which the ring gear 94 is held in a stationary position and the planetary transmission 76 is blocked in itself. The result is a gear ratio of 1:1. Otherwise, the output drive is performed as described in the previous paragraph.

In this way, the result is that with the clutch 96 disengaged and the brake 98 applied, a first gear ratio is obtained; and with the clutch 96 engaged and the brake 98 released, a second gear ratio is obtained that provides a higher gear ratio, and thereby a higher forward propulsion velocity with a given rotational speed of the hydraulic motor 64, than the first gear ratio. The shift process can also be performed when the working machine 10 is driving, since the gears of the planetary transmission 76 are in mesh at all times and no synchronization is required.

The electronic control unit 40 controls the elements of the drive system that can be controlled and is connected to a series of sensors. For this purpose, a bus 102 is provided, which as a rule can be either an LBS or a CAN bus, with which the control unit 40 is connected over a microprocessor or any other appropriate control circuit. The elements that can be controlled and the sensors are also equipped for data transmission over the bus 102 with microprocessors or other appropriate control circuits. Any other desired sensors or actuators can also be connected to the bus 102. Furthermore, several or all of the sensors and/or actuators can be connected directly to the control unit 40 or connected over a communications unit with the bus 102.

The bus 102 is connected with an electronic control unit 104 of the internal combustion engine 38. Furthermore, the bus 102 is connected with the electromagnet 46 for engaging and disengaging the clutch 44 for the drive of the crop processing unit 24 and with an electromagnetic actuator 106 that is arranged for the repositioning of the swash plate of the hydraulic pump 48. The actuator 106 makes it possible to change the flow rate made available by the hydraulic pump continuously or in steps. Furthermore, it makes it possible to reverse the direction of flow of the hydraulic fluid so that the hydraulic motor 64 can be changed from forward to reverse operation. A rotational speed sensor 110 that detects the rotational speed of the output shaft 92 of the transmission 66, for example, optically or magnetically, is connected with the bus 102 as is an electromagnetic actuator 112 that is arranged for the engagement and disengagement of the clutch 96. A pressure sensor 114 connected by a flange to the hydraulic motor 64 detects the pressure of the hydraulic fluid existing at the hydraulic motor 64 and is connected with the bus 102, as is an electromagnetic actuator 116 that is arranged to reposition the swash plate of the hydraulic motor 64. The actuator 116 makes it possible to change the inflow flow rate of the hydraulic motor 64 and thereby reposition the rotational speed of the input shaft 70 at a given flow rate of the hydraulic fluid. Another electromagnetic actuator 118 is used to apply and release the brake 98 and is connected with the bus 102. The second hydraulic motor 68 is also equipped with an electromagnetic actuator 120 that repositions the swash plate of the second hydraulic motor 68 and is connected with the bus 102. The second hydraulic motor 68 is equipped with a pressure sensor 122 to detect the pressure existing at the second hydraulic motor 68 and with a rotational speed sensor 124 to detect the output rotational speed of the second hydraulic motor 68, each of which is connected with the bus 102. In place of the aforementioned electromagnetic actuators 46, 106, 108, 112, 116, 118, and/or 120, hydraulically controlled actuators could also be used that are controlled electromagnetically over appropriate valves Finally, the bus 102 is also connected with a first switch 128, a second switch 134, and a potentiometer 130 as well as an operating element 136 that can also be configured in the form of a potentiometer, which are arranged in the operator's cab 16 within comfortable reach of the operator. The first switch 128 is used to engage or disengage the all-wheel drive. The potentiometer 130 is used to detect the position of a desired speed input means 132 (FIG. 1) in the form of an operating lever, drive lever, knob, or dial within the cab 16 that can be pivoted, rotated and/or slid and which is used to provide a desired speed input signal to the control unit 40 via bus 102. Instead of a potentiometer 130, any other suitable sensor for detecting the position of the desired speed input means 132 can be used, as an encoder interacting with an optic sensor or a magnetic detector interacting with a permanent magnet, for example. The desired speed input means 132 could also be provided in the form of a pedal or a linear sliding element or any other suitable device. The second switch 134 is used to turn the work elements (crop processing unit etc.) on and off by means of the clutch 44. The operating element 136 is used to provide the operator input for the rotational speed of the internal combustion engine 38.

The internal combustion engine 38 is during operation brought to a rotational speed appropriate for operation by the control unit 40 over the electronic control unit 104 that may be provided as a fixed input or may be changed by the operator by means of the operating element 136. The control unit 40 enables the operator to engage the clutch 44 using the second switch 134 and the electromagnet 46, so that the working elements (crop processing unit 24, harvesting platform 18, the feederhouse 20, the beater 22 and the discharge beater 34) can be put into operation. The control unit 40 controls the actuators 106, 116, and 120 of the hydraulic pump 48 and the hydraulic motors 64, 68 corresponding to a target velocity provided as an input by the speed input means 132, that can be provided as an input by the operator. The speed input means 132 can be pivoted forward for forward operation and to the rear for operation in reverse. On the basis of the potentiometer 130, actuators 106, 116, and 120 are controlled by the control unit 40. If the desired speed input means 132 is in a reverse operating position, then the control unit 40 switches the hydraulic pump 48 into a reverse position over the actuator 106. During the reverse operation, any actuation of the second switch 134 is ignored so that the working arrangements are automatically switched into a non-operating mode. The actuator 106 is brought into a position for reverse operation and the clutch 96 is or remains disengaged, and shortly thereafter, the brake 98 is applied so that the transmission 66 remains in the first gear ratio position or reaches that position. The signals of the pressure sensors 114, 122 and the velocity sensors 110, 124 are considered by the control unit 40 during the adjustment of the actuators 106, 116, and 120, and are used to attain the desired forward propulsion velocity of the working machine 10, yet to avoid a spinning of the wheels 14, 15 or backward rotation during all external operating conditions.

If the second switch 128 is in the non-all-wheel operating position, then the control unit 40 arranges for a further valve (not shown) to separate the second hydraulic motor 68 from the hydraulic lines that couple it to hydraulic pump 48 so that it revolves freely with the rear ground engaging means 15.

If the desired speed input means 132 is in a position that corresponds to a forward operation, then the control unit 40 detects the actual forward propulsion velocity of the working vehicle on the basis of the signals of the velocity sensors 110, 124. If it lies below a predetermined threshold value, the clutch 96 is or remains disengaged or deactivated with the use of the actuator 112, and shortly thereafter, the brake 98 is applied or activated by actuator 118. The transmission 66 is thereby placed in the first gear ratio condition. If the actual velocity, however, is below the predetermined threshold value and the pressure sensor 114 signals an allowable pressure, the brake 98 is released or deactivated by actuator 118 and the clutch 96 is engaged by the particular actuator 112 so that the second gear ratio of the transmission 66 is selected. Thereby, the full velocity range is available from the transmission 66 in the road or transport operating mode.

Furthermore, the control unit 40 provides for an automatic transition from the second into the first gear ratio, in which the clutch 96 is disengaged, and preferably shortly thereafter, the brake 98 is applied, as soon as the forward propulsion velocity measured by the velocity sensors 110, 124 falls below the aforementioned threshold value or the pressure sensor 114 detects an excessively high value. The threshold value for a downshift may also be somewhat lower than the threshold value for an upshift in order to avoid by providing this hysteresis frequent, unnecessary shifting of the clutch 96 and the brake 98 in the velocity range close to the threshold value.

From the foregoing description, it is apparent that the propelling speed of the working machine 10 is controlled by the control unit 40 based upon a desired speed input signal provided by potentiometer 130 between a speed of zero and a maximal forward speed and a maximal rearward speed. The control unit 40 controls the actuators 106, 112, 116, 118 and 120 such that the desired speed is obtained. In other embodiments of the invention, it might be possible to use a transmission 66 as disclosed in the second embodiment of EP 1 431 619 A, the contents of which are incorporated herein by reference, or a transmission 66 without an alterable transmission ratio, if the speed range of hydraulic motor 66 is sufficient, or to use a purely mechanic transmission having a transmission ratio that can be changed in one, two, three, four, five, or more steps (synchronized transmission or load switch transmission) or infinitely (IVT, e.g. with variable diameter belt sheaves or a planetary transmission with an element driven with variable speed, for example hydraulic or electric) for driving the ground engaging means 14, or to use an electric motor for driving the ground engaging means. In any way, it is sufficient when the full speed range is available without having to stop the work machine 10 for gear shifting and no manual transmission ratio alteration is necessary.

It would be possible to connect an additional switch to the control unit 40 for enabling the operator to select between a transport mode and a field operating mode. The control unit 40 would ignore switch 134 if the additional switch is in the transport mode, and disable switching into the faster gear in the field operating mode.

Figure 3:
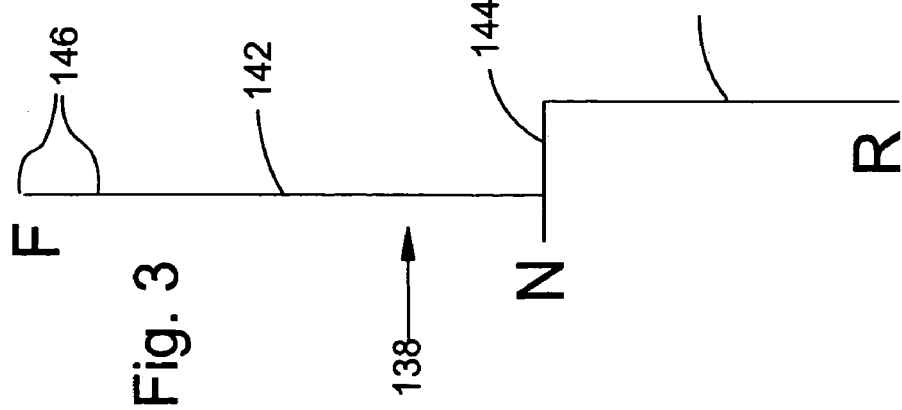
FIG. 3 is a schematic diagram of the stroke of the desired speed input means.

The desired speed input means 132 provides a certain stroke or range of movement to the operator for altering the propelling speed. FIG. 3 shows the range 138 schematically. It has a portion 140 of the range 138 assigned to a rearward mode, and a portion 142 of the range 138 assigned to a forward mode, shown in the upper part of FIG. 3. Between these two range portions 140, 142, a neutral position 144 is provided. The operator needs to shift the desired speed input means 132 laterally through the neutral position 144 to switch between both the range portions 140, 142. The uppermost region of the range portion 142, preferably about 5% of the entire stroke of desired speed input means 132, is designated as an acceleration zone 146.

If the desired speed input means 132 is in the range portion 140, the control unit 40 controls the actuators 106, 112, 116, 118 and 120 such that the rearward speed is linearly dependent on the position of the desired speed input means 132 between a zero speed (when the desired speed input means 132 is at the neutral position 144) and a maximal rearward speed (when the desired speed input means 132 is at the lowermost end of range portion 140).

Figure 4:
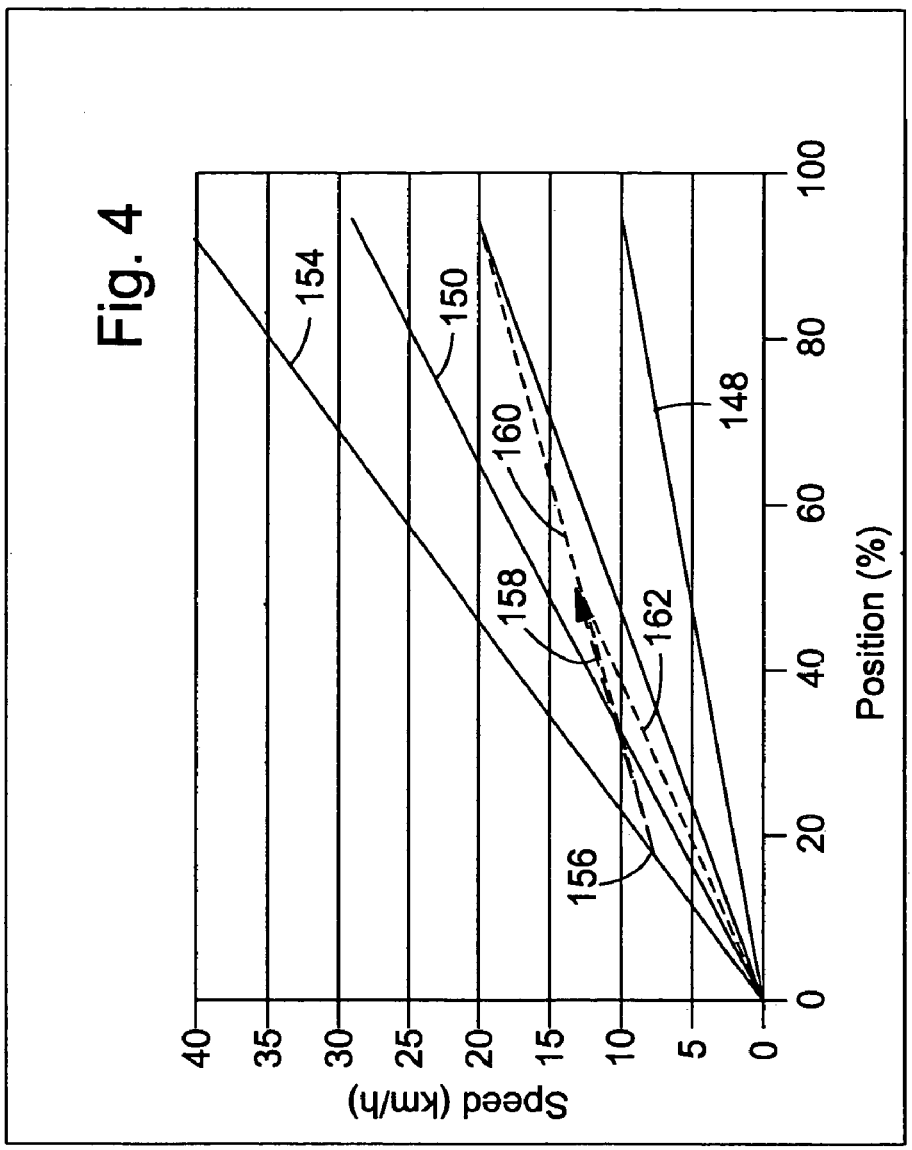
FIG. 4 is a diagram schematically showing possible relations between the position of the speed input means and the propelling speed.

If, on the other hand, the desired speed input means 132 is within range portion 142, the control unit 40 operates as schematically indicated in FIG. 4. Once the working machine 10 starts at a zero speed, a predetermined first relation between the position of the desired speed input means 132 and the propelling speed is used. This relation is linear and indicated with the reference numeral 148 and has a relatively low slope. The operator has an available speed range of zero to 10 km/h corresponding to range portion 142 of the desired speed input means stroke, excluding the acceleration zone 146. If the maximal speed within this stroke is not sufficient, the operator moves the desired speed input means 132 into the acceleration zone 146. In the acceleration zone 146, the control unit 40 instructs the actuators 106, 112, 116, 118 and 120 to accelerate the working machine 10 with a predetermined acceleration, e.g. 0.5 m/s$^2$, until a predetermined maximal speed is achieved or the desired speed input means 132 is retracted again once the working machine 10 has reached a speed desired by the operator.

Once the operator has retracted the desired speed input means 132, the control unit 40 maintains the propelling speed constant, until the desired speed input means 132 remains for a certain time period (e.g. one second) in a constant position within range portion 142. A relation between the speed and the desired speed input means position is then selected from a limited or infinite number of linear relations.

As an example, if the speed after acceleration is 20 km/h and the desired speed input means 132 is at 60% of range portion 142 (since the operator still wants have the possibility to accelerate the machine 10 to a modestly higher speed), the relation 150 shown in FIG. 4 is established as a new relation. If the desired speed input means 132 is then, however, at about 45% of range portion 142 (since the operator still wants have the possibility to accelerate the machine 10 to a much higher speed), the relation 154 will be the new relation. If the desired speed input means 132 is on the other hand then at about 95% of range portion 142 (since the operator has reached the desired end speed and does not want to accelerate the machine 10 further), the relation 152 will be the new relation. The operator can now select the desired propelling speed within a certain speed range corresponding to the established relation between the speed and the desired speed input means position that optimally fits to the actual drive situation and gives the best available resolution. It should be noted that much more then the four shown ranges 148, 152, 150, 154 might be provided in order to avoid unwanted acceleration or deceleration of the machine 10 due to misfit between the range and the achieved speed once the desired speed input means 132 is retracted.

After the working machine 10 has been driving with a constant speed for a certain time, it is not probable that the operator desires to accelerate to a relatively high speed, but slow accelerations are more probable. An example is shown in FIG. 4 at point 156 where the steepest relation between the speed and the desired speed input means position was established, but the desired speed input means 132 is in a relatively low position at least for a certain time period, e.g. 30 seconds. In this case, the control unit 40 instructs the actuators 106, 112, 116, 118 and 120 to accelerate the working machine 10 with a relation between the speed and the desired speed input means having a smaller slope as the originally established relation 154 if the operator moves the desired speed input means 132 into a higher speed position. The slope is indicated by arrow 158 in FIG. 4. If the operator moves the desired speed input means 132 further beyond end of arrow 158, the dotted curve 160 is used, which is just an extension of arrow 158. It should be noted that the lower slope might only be used when the desired speed input means 132 is for a certain time within a predetermined lower portion of range portion 142, e.g. within its lower 50%, but if it is within the remaining portion, still relation 154 is used for acceleration. Should the operator decelerate once the end of arrow 158 is achieved, the speed is decreasing linearly, as indicated with 162. At point 156, the speed would also be decreased according to the originally established relation 154 if the operator slows down.

The invention claimed is:

1. A self-propelled working machine comprising:
    ground engaging means that are in drive connection with an engine for propelling the working machine;
    a desired speed input means having a range of movement for inputting a desired speed;
    a control unit operable to receive a desired speed signal from the desired speed input means and operable to control an actuator that is influencing the speed of the ground engaging means based upon the desired speed signal, characterized in that the control unit is operable to automatically establish a relation between the desired speed signal and a propelling speed based upon the desired speed signal, characterized in that the control unit is operable to control the actuator to accelerate the working machine beyond the maximal speed designated by the relation established between the desired speed signal and the propelling speed when the desired speed signal corresponds to an acceleration signal, the acceleration signal indicating a position of the desired speed input means within an upper speed portion of a range designated by the relation established between the desired speed signal and the propelling speed.

2. A working machine according to claim 1, characterized in that the control unit is operable to establish a new relation between the desired speed signal and the propelling speed each time the desired speed signal corresponds over a time period at least approximately to the acceleration signal and thereafter to a reduced speed, and to base the relation between the desired speed signal and the propelling speed upon the actual propelling speed of the working machine when the desired speed signal changes to the reduced speed.

3. A working machine according to claim 2, characterized in that the control unit is operable to select the relation between the desired speed signal and the propelling speed such that the speed of the working machine is kept constant until the desired speed input means keeps for a predetermined time into its reduced speed position.

4. A working machine according to claim 1, characterized in that the engine is connected to a hydraulic pump, that the hydraulic pump is in hydraulic connection with a hydraulic motor, and that the motor is in a drive connection to the ground engaging means, via a transmission having a transmission ratio automatically controlled by the control unit.

5. A self-propelled working machine comprising:
    ground engaging means that are in drive connection with an engine for propelling the working machine;
    a desired speed input means having a range of movement for inputting a desired speed;
    a control unit operable to receive a desired speed signal from the desired speed input means and operable to control an actuator that is influencing the speed of the ground engaging means based upon the desired speed signal, characterized in that the control unit is operable to automatically establish a relation between the desired speed signal and a propelling speed based upon desired speed signal, characterized in that the control unit is operable to automatically select a first relation between the desired speed signal and the propelling speed when the working machine is starting driving, the first relation having a relatively small slope.

6. A self-propelled working machine comprising:
    ground engaging means that are in drive connection with an engine for propelling the working machine;
    a desired speed input means having a range of movement for inputting a desired speed;
    a control unit operable to receive a desired speed signal from the desired speed input means and operable to control an actuator that is influencing the speed of the ground engaging means based upon the desired speed signal, characterized in that the control unit is operable to automatically establish a relation between the desired speed signal and a propelling speed based upon the desired speed signal, characterized in that the control unit is operable to change the relation between the desired speed signal and the propelling speed to a relation with a lower slope each time the desired speed signal is increased after it has been constant for a predetermined time period, and only if the desired speed signal is below a predetermined threshold.

7. A self-propelled working machine comprising:
    ground engaging means that are in drive connection with an engine for propelling the working machine;
    a desired speed input means having a range of movement for inputting a desired speed;
    a control operable to receive a desired speed signal from the desired speed input means and operable to control an actuator that is influencing the speed of the ground engaging means based upon the desired speed signal, characterized in that the control unit is operable to automatically establish a relation between the desired speed signal and a propelling speed based upon the desired speed signal, characterized in that the control unit is operable to maintain the relation between the desired speed signal and the propelling speed when the desired speed signal is decreased after it has been constant over a predetermined time period.

8. A self-propelled working machine comprising:
    ground engaging means that are in drive connection with an engine for propelling the working machine;
    a desired speed input means having a range of movement for inputting a desired speed;
    a control unit operable to receive a desired speed signal from the desired speed input means and operable to control an actuator that is influencing the speed of the ground engaging means based upon the desired speed signal, characterized in that the control unit is operable to automatically establish a relation between the desired speed signal and a propelling speed based upon the desired speed signal, characterized in that the control unit is operable to select the relation between the desired speed signal and the propelling speed from a plurality of linear relations.

9. A method of controlling a self-propelled working machine comprising ground engaging means that are in drive connection with an engine for propelling the working machine, comprising the steps of:
provide a desired speed input means having a range of movement by the operator for inputting a desired speed, the means being configured to provide a desired speed signal indicative of the desired speed;
receiving the desired speed signal at a control unit from the desired speed input means;
controlling an actuator that is influencing a propelling speed of the ground engaginq means based upon the desired speed signal, characterized in that the control unit is configured to automatically determine a relation between the desired speed signal and the propelling speed based upon the desired speed signal; and
accelerating the working machine beyond a maximal speed designated by the relation established between the desired speed signal and the propelling speed when the desired speed signal corresponds to an acceleration signal, the acceleration signal indicating a position of the desired speed input means within an upper speed portion of a range portion of a range designated by the relation established between the desired speed signal and the propelling speed.

10. The method of claim 9, further comprising the step of:
establishing a new relation between the desired speed signal and the propelling speed each time the desired speed signal corresponds over a time period at least approximately to the acceleration signal and thereafter to a reduced speed,
wherein the new relation between the desired speed signal and the propelling speed is based upon the actual propelling speed of the working machine when the desired speed signal changes to the reduced speed.

11. The method of claim 10, further comprising the step of:
keeping the propelling speed of the working machine constant until the desired speed input keeps for predetermined time into its reduced speed position.

12. A method of controlling a self-propelled working machine comprising ground engaging means that are in drive connection with an engine for propelling the working machine, comprising the steps of:
providing a desired speed input means having a range of movement by the operator for inputting a desired speed, the means being configured to provide a desired speed signal indicative of the desired speed;
receiving the desired speed signal at a control unit from the desired speed input means;
controlling an actuator that is influencing a propelling speed of the ground engaging means based upon the desired speed signal, characterized in that the control unit is configured to automatically determine a relation between the desired speed signal end the propelling speed based upon the desired speed signal; and
automatically selecting a first relation between the desired speed signal and the propelling speed when the working machine is starting driving, the first relation having a relatively small slope.

13. A method of controlling a self-propelled working machine comprising ground engaging means that are in drive connection with an engine for propelling the working machine, comprising the steps of:
providing a desired speed input means having a range of movement by the operator for inputting a desired speed, the means being configured to provide a desired speed signal indicative of the desired speed;
receiving the desired speed signal at a control unit from the desired speed input means;
controlling an actuator that is influencing a propelling speed of the ground engaging means based upon the desired speed signal, characterized in that the control unit is configured to automatically determine a relation between the desired speed signal and the propelling speed based upon the desired speed signal; and
changing the relation between the desired speed signal and the propelling speed to a relation with a lower slope each time the desired speed signal is increased after it has been constant for a predetermined time period, and only if the desired speed signal is below a predetermined threshold.

14. A method of controlling a self-propelled working machine comprising ground engaging means that are in drive connection with an engine for propelling the working machine, comprising the steps of:
providing a desired speed input means having range of movement by the operator for inputting a desired speed, the means being configured to provide a desired speed signal indicative of the desired speed;
receiving the desired speed signal at a control unit from the desired speed input means;
controlling an actuator that is influencing a propelling speed of the ground engaging means based upon the desired speed signal, characterized in that the control unit is configured to automatically determine a relation between the desired speed signal and the propelling speed based upon the desired speed signal; and
maintaining the relation between the desired speed signal and the propelling speed when the desired speed signal is decreased after it has been constant over a predetermined time period.

15. A method of controlling a self-propelled working machine comprising ground engaging means that are in drive connection with an engine for propelling the working machine, comprising the steps of:
providing a desired speed input means having a range of movement by the operator for inputting a desired speed, the means being configured to provide a desired speed signal indicative of the desired speed;
receiving the desired speed signal at a control unit from the desired speed input means;
controlling an actuator that is influencing a propelling speed of the ground engaging means based upon the desired speed signal, characterized in that the control unit is configured to automatically determine a relation between the desired speed signal and the propelling speed based upon the desired speed signal; and
selecting the relation between the desired speed signal and the propelling speed from a plurality of relations.

16. The method of claim 15, wherein the plurality of relations includes linear relations.

* * * * *